US007606649B2

(12) United States Patent
Sato (10) Patent No.: US 7,606,649 B2
(45) Date of Patent: Oct. 20, 2009

(54) VEHICLE CONTROL SYSTEM ENSURING STABILITY OF CONTROL

(75) Inventor: Masahiro Sato, Aichi-ken (JP)

(73) Assignee: Denso Corporation, Kariya (JP)

( * ) Notice: Subject to any disclaimer, the term of this patent is extended or adjusted under 35 U.S.C. 154(b) by 862 days.

(21) Appl. No.: 11/046,689

(22) Filed: Feb. 1, 2005

(65) Prior Publication Data

US 2005/0171669 A1 Aug. 4, 2005

(30) Foreign Application Priority Data

Feb. 3, 2004 (JP) ............................. 2004-027138

(51) Int. Cl.
*G06F 7/00* (2006.01)
*G06F 17/00* (2006.01)
*F16H 61/662* (2006.01)

(52) U.S. Cl. ............................. 701/54; 701/53; 701/62; 477/97; 477/107; 477/110; 477/111

(58) Field of Classification Search .................. 701/53, 701/54, 62; 477/97, 107, 110, 111
See application file for complete search history.

(56) References Cited

U.S. PATENT DOCUMENTS

| 6,066,070 | A | * | 5/2000 | Ito et al. ........................ 477/43 |
| 6,181,020 | B1 | * | 1/2001 | Uchida et al. ............. 290/40 C |
| 6,482,122 | B2 | * | 11/2002 | Ochiai et al. .................. 477/42 |
| 6,513,611 | B2 | * | 2/2003 | Ito et al. ...................... 180/179 |
| 6,565,481 | B2 | * | 5/2003 | Toukura et al. .............. 477/107 |
| 6,568,257 | B2 | * | 5/2003 | Jankovic et al. ........... 73/114.31 |
| 6,640,179 | B2 | * | 10/2003 | Katakura et al. .............. 701/54 |
| 6,662,098 | B2 | * | 12/2003 | Hellmann et al. ............. 701/95 |
| 6,663,532 | B1 | * | 12/2003 | McIndoe et al. ............... 477/43 |
| 6,726,594 | B2 | * | 4/2004 | Mizuno et al. ................ 477/37 |
| 6,875,152 | B2 | * | 4/2005 | Iwatuki et al. ................ 477/44 |
| 2006/0175997 | A1 | * | 8/2006 | Hommi et al. .............. 318/432 |

FOREIGN PATENT DOCUMENTS

JP 2000-289496 10/2000
JP 2002-21595 1/2002

OTHER PUBLICATIONS

Examination Report mailed Jan. 22, 2008 in JP Patent Application No. 2004-027138 with English translation.

* cited by examiner

*Primary Examiner*—Khoi Tran
*Assistant Examiner*—Ian Jen
(74) *Attorney, Agent, or Firm*—Nixon & Vanderhye P.C.

(57) ABSTRACT

A vehicle control system for automotive vehicles which is designed to optimize an output torque of a power train at all times. A power train control unit determines an allowable torque range within which the power train is allowed to output torque and provides it to a manager control unit. The manager control unit determines a target output torque of the power train based on an operating maneuver of a vehicle driver. When the target output torque is out of the allowable torque range, the manager control unit corrects it to lie within the allowable torque range, thereby optimizing an output of the power train.

9 Claims, 6 Drawing Sheets

|  | ON | OFF |
|---|---|---|
| AIR CONDITIONER | ACONTRQ | ACOFTRQ |
| DEFOGGER | DEFONTRQ | DEFOFTRQ |
| POWER STEERING DEVICE | PWSONTRQ | PWSOFTRQ |

VEHICLE CONTROL SYSTEM ENSURING STABILITY OF CONTROL

CROSS REFERENCE TO RELATED DOCUMENT

The present application claims the benefit of Japanese Patent Application No. 2004-27138 filed on Feb. 3, 2004, the disclosure of which is incorporated herein by reference.

BACKGROUND OF THE INVENTION

1. Technical Field of the Invention

The present invention relates generally to a vehicle control system designed to control an output torque of a power train of an automotive vehicle as functions of parameters indicative of operating maneuvers of a vehicle driver and variables controlled by other systems installed in the vehicle.

2. Background Art

Japanese Patent First Publication No. 5-85228 discloses a vehicle control system designed to control an output torque of a power train of automotive vehicles. The vehicle control system is constructed of a plurality of hierarchical elements. The hierarchical elements include a vehicle driver and control units installed in the vehicle. Defined to be the highest in level is a vehicle driver and lower in level are the control units.

Specifically, a command from the vehicle driver of the first hierarchical level is sensed by, for example, a position sensor for an accelerator pedal, a brake pedal, or a steering wheel and then outputted to the control unit of the second hierarchical level. This unit outputs a signal to change dynamic running characteristics of the vehicle to meet the intention of the vehicle driver. For instance, the control unit of the second hierarchical level monitors a driver's effort on the accelerator pedal or the brake pedal to determine a positive or negative acceleration of the vehicle as required by the driver and outputs it to the control unit (i.e., a power train and brake controller) which is defined to be at the third hierarchical level and works to change torque of wheels of the vehicle.

The control unit of the third hierarchical level samples the data inputted thereto which indicates the required acceleration (i.e., the intention of the driver). When the data indicates a request to brake the vehicle, the control unit determines a required degree of deceleration or brake torque to be applied to each wheel. Alternatively, when the data indicates a request to accelerate or keep the vehicle at a constant speed, the control unit determines a required degree of running torque to be outputted from the power train.

Upon the determination of the required brake torque, a control signal indicative thereof to a brake device defined to be at the fourth hierarchical level.

Alternatively, upon the determination of the required running torque, a control signal indicative thereof is outputted to the power train which is defined to be at the fourth hierarchical level. The power train works to determine an output torque of the engine and a gear ratio of a transmission required to achieve the required running torque and output a control signal indicative of the target engine output torque to an engine controller which is defined to be at the fifth hierarchical level and a control signal indicative of the target gear ratio to a transmission controller which is defined to be at the fifth hierarchical level. The running torque required to be outputted from the power train is, thus, converted into a combination of the target engine output torque and the target transmission gear ratio which is so selected as to minimize consumption of energy in the vehicle.

As apparent from the above discussion, the conventional vehicle control system works to provides a target controlled variable from one of the hierarchical elements which is higher in hierarchical level to a lower one to optimize control of the whole system in order to achieve a selected object (e.g., saving of energy consumption). In other words, the system is so designed as to provide an instruction unilaterally from one of the hierarchical elements to another.

The above type of control system, however, encounters the following drawbacks.

Usually, power trains of automotive vehicles have an allowable torque range within which torque is allowed to be outputted depending upon an operating condition of the engine, loads exerted by engine-driven accessories on the engine, and running conditions of the vehicle. Therefore, when the power train controller is given the target output torque by a higher one of the hierarchical elements which is determined without regard to such an allowable torque range, it may result in a difficulty in controlling an operation of the power train correctly.

Additionally, for instance, if a higher one of the hierarchical elements has failed in operation and has instructed the power train controller in error to output a constant torque continuously, it may cause the power train to be placed in an unintended condition, so that an unwanted torque is outputted.

SUMMARY OF THE INVENTION

It is therefore a principal object of the invention to avoid the disadvantages of the prior art.

It is another object of the invention to provide a vehicle control system designed to control an output torque of a power train correctly at all times.

If is a further object of the invention to provide a vehicle control system designed to detect a failure in operation of one of hierarchical elements which is higher in hierarchical level.

According to one aspect of the invention, there is provided a vehicle control system which may be employed in automotive vehicles equipped with a power train. The control system comprises: (a) a target output torque determining block which determines a target output torque of the power train of the vehicle at least based on a preselected operating maneuver by an operator of a vehicle; (b) an allowable torque range determining block which determines an allowable torque range, within which the power train is allowed to output torque, based on an operating condition of the power train; (c) a target output torque correction block which keeps the target output torque, as determined by the target output torque determining block, as it is when the target output torque lies within the allowable torque range and also corrects the target output torque to be within the allowable torque range when the target output torque lies out of the allowable torque range; and (d) a power train control block which controls an operating of the power train to bring an output of the power train into agreement with the target output torque, as provided by the target output torque correction block.

Specifically, the vehicle control system works to determine or correct the target output torque of the power train to lie within the allowable torque range, thereby optimizing the torque to be outputted from the power train at all times.

The allowable torque determining block may use a specific torque output characteristic of the power train as a basis and considers an actual operating condition of the power train into account for determining the allowable torque range. This compensates for a unit-to-unit variation in operation of the power train.

The power train includes an engine and a transmission. The allowable torque determining block may use as the operating condition of the power train at least one of a speed of the engine, a temperature of coolant of the engine, a shift timing of the transmission, a load on the engine resulting from an operation of an engine-driven accessory, and a running speed of the vehicle. Usually, the output torque of the engine depends upon the speed of the engine, thus resulting in a change in the allowable torque range of the power train. When the engine coolant temperature is low, the output of the power train should be increased in order to warm up the engine. Conversely, when the engine coolant temperature is high, the output of the power train should be decreased in order to avoid overheating of the engine. During a gear shift of the transmission, the output of the power train is preferably decreased in order to avoid a shift shock. When the loads exerted on the engine by the accessories are high, the output of the engine is preferably elevated in order to avoid engine stall. When the vehicle is started, the output of the power train is preferably decreased in order to avoid unintended violent acceleration of the vehicle. When the vehicle is traveling at high speeds, and it is required to actuate a speed limiter, the output of the power train is required to be decreased.

The allowable torque determining block may also use information on a failure in controlling the power train as the operating condition of the power train and decrease an upper limit of the allowable torque range.

The target output torque determining block may also use an operating condition of the vehicle to determine the target output torque of the power train.

The target output torque determining block may also use as the operating condition of the vehicle at least one of requests from an adaptive cruise control to bring a distance between the vehicle and a preceding vehicle to agreement with a set one, a vehicle stabilization control to stabilize running of the vehicle, and a vehicle security control.

The target output torque determining block and the target output torque correction block may be constructed in a first electronic control unit. The allowable torque range determining block and the power train control block may be constructed in a second electronic control unit.

The second electronic control unit determines the allowable torque range of the power train through the allowable torque range determining block and transmits a signal indicative thereof to the first electronic control unit. The first electronic control unit receives the signal from the second electronic control unit to sample the allowable torque range and determines the target output torque within the allowable torque range through the target output torque determining block and the target output torque correction block to output a signal indicative thereof to the second electronic control unit. The second electronic control unit includes a failure determination block which compares the target output torque, as carried by the signal from the first electronic control unit, with the allowable torque range. When the target output torque lies out of the allowable torque range, the failure determination block determines that an error has arisen in the target output torque.

The failure determining block may make a determination of whether the target output torque lies out of the allowable torque range or not in a cycle. When a consecutive number of determinations that the target output torque lies out of the allowable torque range are made, the failure determining block may determine that the error has arisen.

When the failure determining block determines that the error has arisen, the second electronic control unit may set a value of the target output torque to within a given safe torque range and control the power train to bring an output of the power train into agreement with the set value of the target output torque.

The vehicle control system may further comprising a brake control block which controls a brake torque to be applied to a wheel of the vehicle. The target output torque determining block and the target output torque correction block may be constructed in a manager control unit. At least one of the power train control block and the brake control block transmits a signal indicative of an operating condition of the vehicle to the manager control unit. The manager control unit also uses the operating condition of the vehicle to determine the target output torque of the power train.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
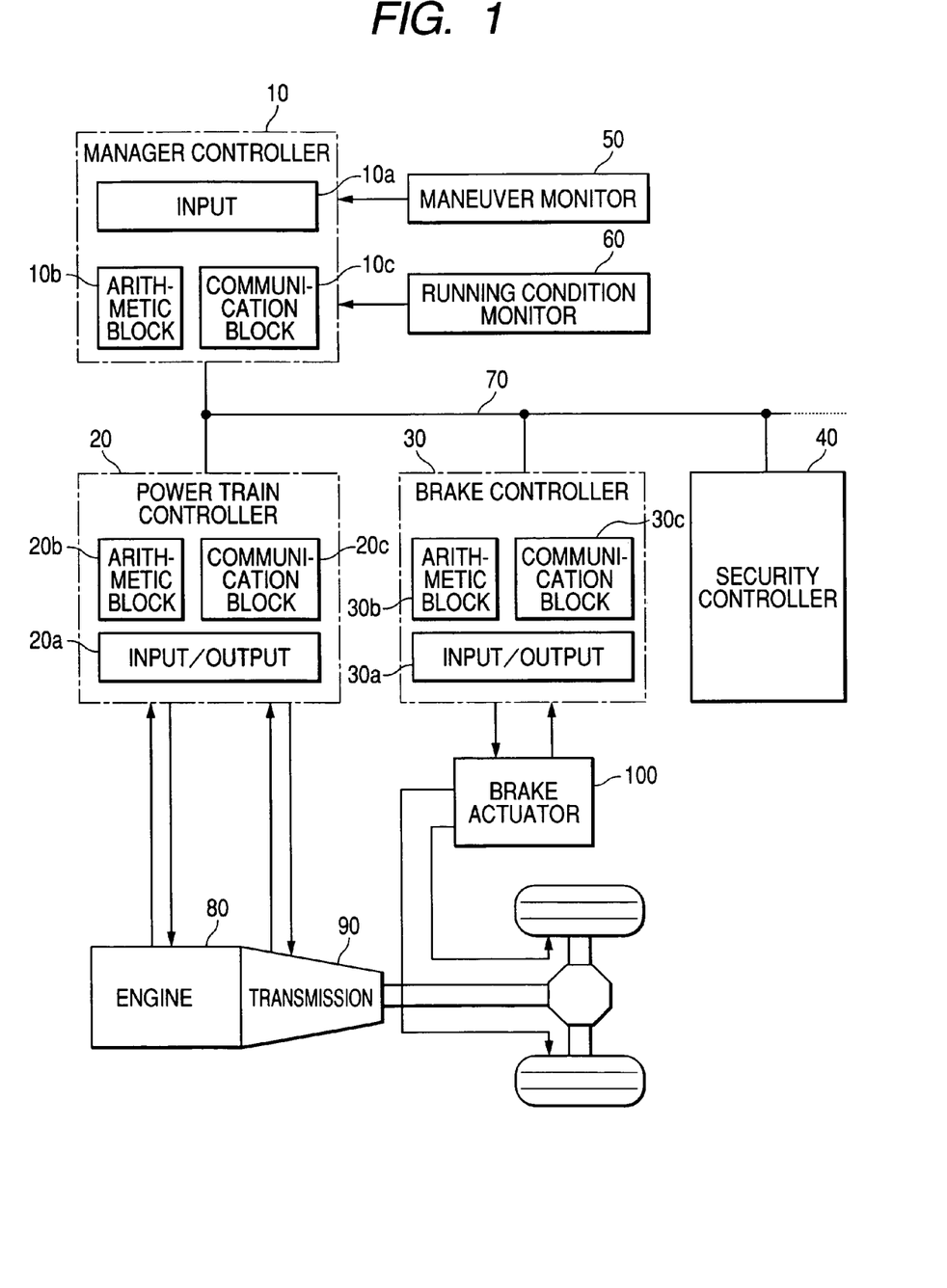
FIG. 1 is a block diagram which shows a vehicle control system according to the present invention.

Referring to the drawings, wherein like reference numbers refer to like parts in several views, particularly to FIG. 1, there is shown an automotive control system according to the invention which consists essentially of a plurality of electronic control blocks: a manager control unit 10, a power train control unit 20, a brake control unit 30, and a security control unit 40. The manager control unit 10 is placed on the highest hierarchical level of the automotive control system and designed to provide target controlled variables to the power train control unit 20, the brake control unit 30, and the security control unit 40.

The manager control unit 10, the power train control unit 20, the brake control unit 30, and the security control unit 40 are connected with each other through a local area network (LAN) 70 for data communications therebetween. The manager control unit 10 works to output an output torque command (i.e., a target output torque) to the power train control unit 20 and a brake command (i.e., a target brake torque) to the brake control unit 30.

The manager control unit 10 is made up of an input circuit 10a, an arithmetic circuit 10b, and a communication circuit 10c. The input circuit 10a connects with a driver's maneuver monitor 50 and a running condition monitor 60. The manager control unit 10 acquires information about operational maneuvers of an operator or driver in the automotive vehicle and running conditions of the vehicle from outputs of the driver's maneuver monitor 50 and the running condition monitor 60. The manager control unit 10 analyzes the operational maneuvers and the running conditions in the arithmetic circuit 10b comprehensively to determine the target controlled variables and outputs control signals indicative of the target controlled variables to the power train control unit 20 and the brake control unit 30 through the communication circuit 10c.

The driver's maneuver monitor 50 is made up of an accelerator sensor, a brake sensor, and a steering sensor (not shown) and works to produce driver's maneuver information on efforts on an accelerator pedal and a brake pedal by the vehicle driver and a steered angle of a steering wheel of the vehicle. The running condition monitor 60 is equipped with sensors (not shown) which measure the running speed of the vehicle, the rotational speed of each wheel, the distance between the system vehicle equipped with this system and a preceding vehicle, and the yaw rate and acceleration acting on the vehicle body and works to determine the running conditions using such parameters.

The power train control unit 20 is, like the manager control unit 10, made up of an input/output circuit 20a, an arithmetic circuit 20b, and a communication circuit 20c. The communication circuit 20c receives the output torque command indicative of a target output torque, as outputted from the manager control unit 10. The arithmetic circuit 20b analyzes the target output torque to determine a target engine torque of an engine 80 and a target gear ratio of a transmission 90 which are required to achieve the target output torque and produces torque and gear ratio control signals required to achieve the target engine torque and the target gear ratio. The torque control signals are inputted from the input/output circuit 20a into a throttle valve actuator, a fuel injection system, and an ignition device for the engine 80 to bring an output of the engine 80 into agreement with the target engine torque. The gear ratio control signal is inputted to the transmission 90 to control the speed of the transmission 90 at the target gear ratio. Specifically, the power train control unit 20 works to control a power train made up of the engine 80 and the transmission 90 using the torque and gear ratio control signals so as to produce the target output torque.

The power train control unit 20 acquires through the input/output circuit 20a data on operating conditions of the power train such as the speed of the engine 80, the temperature of an engine coolant, and a selected speed of the transmission 90. The power train control unit 20 also monitors controllers of engine-driven accessories such as a power steering device, an air conditioner, a defogger, etc. (not shown) through the LAN 70 to acquire operating conditions thereof. The LAN 70 is electrically connected with the accessory controllers mounted in the vehicle for data transmission therebetween.

The brake control unit 30 is, like the power train control unit 20, made up of an input/output circuit 30a, an arithmetic circuit 30b, and a communication circuit 30c. The communication circuit 30c receives the control signal from the manager control unit 10 indicative of a target brake torque to be applied to each wheel. The arithmetic circuit 30b produces a brake control signal required to achieve the target brake torque and outputs it to a brake actuator 100 from the input/output circuit 30a. The brake actuator 100 includes a solenoid valve and a pump (not shown) and works to apply a target braking force (i.e., the target brake torque) to the wheels of the vehicle.

The brake control unit 30 also receives data on a braking force applied by the brake actuator 100 actually to each wheel (e.g., a brake fluid pressure) through the input/output circuit 30a.

The security control unit 40 works as an antitheft device. Upon input of a radio signal from a portable key carried by a person, the security control unit 40 analyzes an identification code transmitted from the portable key to determine whether the person is an authorized user or not. If the identification code mismatches a correct one, the security control unit 40 locks the steering wheel and/or holds the engine 80 from starting to prevent the vehicle from being stolen. For example, if a person has tried to start the engine using a unauthorized key, the manager control unit 10 acquires data indicating that an identification mode transmitted from the key is not a correct one from the security control unit 40 and sets the target output torque to zero (0) to disenable the engine.

The manager control unit 10 is, as apparent from the above, basically designed to determine the value of the target output torque of the power train based on operational maneuvers of the vehicle driver and may also work to alter or correct it upon requests from a variety of vehicle controls.

For instance, the vehicle control system of this embodiment may be designed to perform adaptive cruise control to keep the distance between the system vehicle and a preceding vehicle at a set one, traction control to avoid slippage of the wheels during acceleration of the system vehicle, and attitude control to ensure the stability of the attitude of the system vehicle during cornering. When the adaptive cruise control has been entered, the vehicle control system first determines the value of the target output torque of the power train based on a request from the adaptive cruise control. Specifically, the vehicle control system calculates a target value of acceleration/deceleration of the system vehicle as functions of a deviation of the distance between the system vehicle and a preceding vehicle from a set one and a relative speed of the system vehicle to the preceding vehicle and determines values of the target output torque of the power train and the target brake torque to be produced by the brake actuator 100 to keep the distance to the preceding vehicle at the set one without needs for driver's efforts on the accelerator and brake pedals.

The set distance between the system vehicle and a preceding vehicle traveling ahead is a target intervehicle distance required in the adaptive cruise control which is usually set to be decreased with a decrease in speed of the system vehicle and increased with an increase in speed of the system vehicle. The target value of acceleration/deceleration of the system vehicle is determined by look-up using a two-dimensional map as functions of the distance deviation and the relative speed, as described above, to keep the distance between the system vehicle and a preceding vehicle near the target one.

For instance, when an actual distance between the system vehicle and a preceding vehicle is smaller than a set one so that the distance deviation has a minus value, but the preceding vehicle is faster than the system vehicle so that the relative speed as a plus value, the intervehicle distance to the preceding vehicle is expected to increase. The vehicle control system, thus, sets the target value of acceleration/deceleration of the system vehicle to zero (0) or more to keep the speed of the system vehicle constant or increase it. In this way, the vehicle control system works to ensure the stability in brining the intervehicle distance to the set one in light of the relative speed to the preceding vehicle.

When the vehicle control system has entered the traction control or the attitude control to stabilize the running of the system vehicle, it means that the wheel slippage or instability of attitude of the system vehicle has arisen from improper maneuvers of the vehicle driver. It is, thus, impossible to determine the target output torque of the power train to stabilize the running of the system vehicle only based on the maneuvers of the vehicle driver. To avoid this, the vehicle control system determines values of the target output torque of the power train and the target brake torque to be produced by the brake actuator 100 based on the maneuvers of the vehicle driver and corrects them upon requests from the traction and/or attitude controls.

For instance, when the traction control has been initiated, the vehicle control system works to decreases the target output torque, as determined as a function of an effort on the accelerator pedal by the driver, to eliminate the acceleration skid. When the attitude control has been initiated, the vehicle control system works to sample the speed and steered angle of the system vehicle to calculate a yaw rate to determine whether the system vehicle is being understerred or oversteered. If the yaw rate is smaller, and the system vehicle has been determined as being understerred, the vehicle control system decreases the target output torque to reduce the output of the engine 80 and also applies the target brake torque to an inside rear one of the wheels to add moment to the system vehicle which is equivalent to a lack of the yaw rate during cornering. Alternatively, if the yaw rate is greater, and the system vehicle has been determined as being oversteered, the vehicle control system applies the target brake torque to an outside front one of the wheels to add an outward moment to the system vehicle during cornering.

The vehicle control system of this embodiment, as described above, works to determine and correct the target output torque of the power train and the target brake torque applied to the wheels so as to match an actual running condition of the system vehicle upon demands from the various vehicle controls.

The vehicle control system may also be equipped with a cruise control system to keep the speed of the system vehicle at a selected target one, an antilock brake system to avoid the slippage of the wheels, and/or a collision impact absorbing system to alleviate a physical impact acting on the vehicle body upon collision with an obstacle and designed to correct values of the target output torque of the power train and the target brake torque to be produced by the brake actuator 100 upon demands from such systems.

As described above, the vehicle control system of this embodiment works to determine the target output torque of the power train and the target brake torque to be produced by the brake actuator 100 through the manager control unit 10 and output command signals indicative thereof to the power train control unit 20 and the brake control unit 30. Usually, the range of torque the power train is permitted to produce changes with changes in operating condition of the engine 80, load on the engine 80 arising from activation of engine-driven accessories such as a power steering device, an air conditioner, a defogger, etc., and running condition of the system vehicle. Thus, if the manager control unit 10 commands the power train control unit 20 to produce the target output torque without regard to an allowable torque range of the power train, the power train control unit 20 may fail to control the power train (i.e., the engine 80 and the transmission 90) to achieve the target output torque.

In order to the above problem, the power train control unit 20 is designed to monitor an operating condition of the power train to determine the allowable torque range and inform the manager control unit 10 of it. The manager control unit 10 calculates a value of the target output torque based on operational maneuvers of the driver and operating conditions of the vehicle within the allowable torque range, thereby keeping an output torque of the power train at an optimum level at all times.

The allowable torque range usually depends upon specifications of the engine 80 and the transmission 90 and needs to be determined taking specific torque output characteristics as well as an actual operating condition of the power train into account. Additionally, the torque to be outputted by the engine 80 and a gear ratio to be selected in the transmission 90 required to produce the target output torque, as determined by the manager control unit 10, also depend upon the type of the power train. The power train control unit 20, thus, needs to be designed taking specific performance and characteristics of the power train into consideration. This permits the manager control unit 10 to be designed regardless of the type of the power train.

For instance, if the manager control unit 10 has failed in operation, so that it continues to command the power train control unit 20 to produce a constant output torque in the power train, it may cause the output torque to be out of a desirable range. In order to avoid this drawback, the power train control unit 20 works to determine whether the target output torque, as requested by the manager control unit 10, lies within the allowable torque range or not to check the correctness of the target output torque. If it is determined that the target output torque, as requested by the manager control unit 10, is erroneous, the power train control unit 20 determines a preselected allowable output torque as a target one and controls the operation of the power train to achieve such a target torque. This avoids output of unintended torque from the power train and assures a minimum torque required by the system vehicle to travel to an automotive workshop, for example.

Determinations of the allowable torque range and error of the target output torque to be made by the power train control unit 20 and a determination of the target output torque to be made by the manager control unit 10 will be described below with reference to FIGS. 2 to 6.

Figure 2:
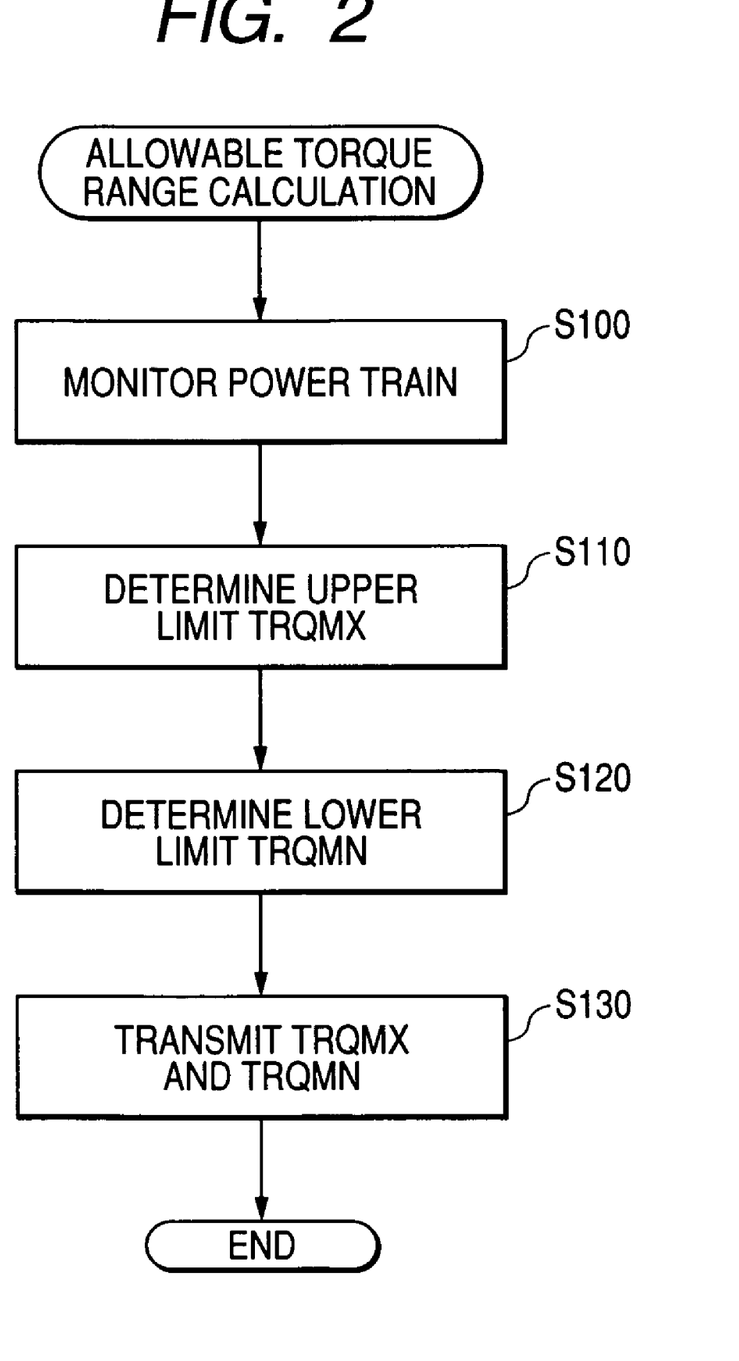
FIG. 2 is a flowchart of a program to be executed by a power train control unit of the vehicle controls system of FIG. 1 to determine an allowable torque range in which a power train is allowed to output torque.

FIG. 2 is a flowchart of a sequence of logical steps or program to be executed by the power train control unit 20.

After entering the program, the routine proceeds to step 100 wherein preselected parameters indicative of operating conditions of the power train are sampled. Specifically, the power train control unit 20 monitors, as described above, the speed of the engine 80, the temperature of coolant of the engine 80, the speed, as now being selected by the transmission 90, and on/off states of engine-driven accessories such as a power steering device, an air conditioner, and a defogger. The power train control unit 20 also monitors a shift timing in the transmission 90 and acquires information on failure in operation of the power train for use in calculating an upper limit of the allowable torque range of the power train in the following step.

The routine proceeds to step 110 wherein an upper limit TRQMX of the allowable torque range is determined using the parameters indicating the operating conditions of the power train, as derived in step 100. An example of this determination will be described below using FIGS. 3(a) to 3(f).

Figure 3A:
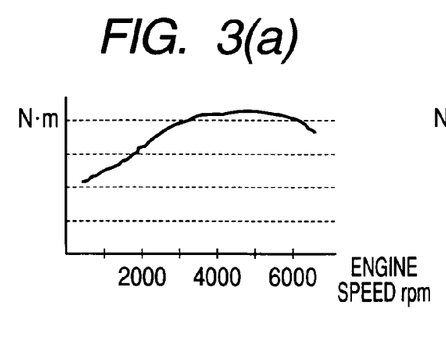
FIGS. 3(a), 3(b), 3(c), 3(d), 3(e), and 3(f) are maps used to delimit an allowable torque range of a power train.

FIG. 3(a) demonstrates a torque curve which depends upon the type of the power train and represents a maximum torque the power train is permitted to output as a function of speed of the engine 80. The torque curve represents a limit of performance of the power train and is used as a basis for determining the allowable torque range of the power train.

Figure 3B:
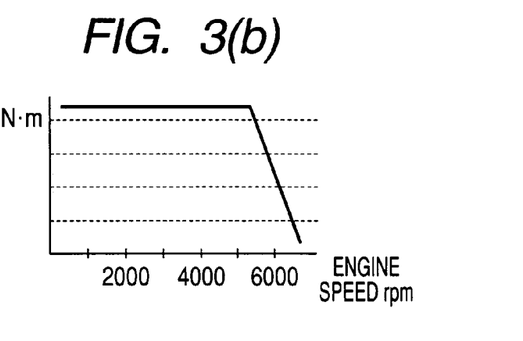

FIG. 3(b) demonstrates a torque control curve used to limit the output torque of the power train for preventing over-revolution of the engine 80 when the speed of the engine 80 exceeds a preselected value.

Figure 3C:
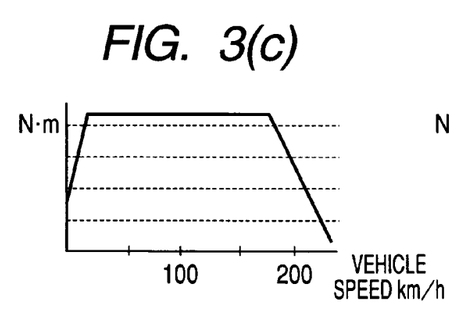

FIG. 3(c) demonstrates a torque control curve used to limit the output torque of the power train as a function of the speed of the system vehicle. Specifically, the torque to be outputted by the power train is decreased to reduce a maximum speed of the system vehicle to one set within a given higher speed range and also to avoid unintended violent acceleration of the system vehicle within a given lower speed range. The torque control within the lower speed range is useful in a case where the power train is designed to output high torque.

Figure 3D:
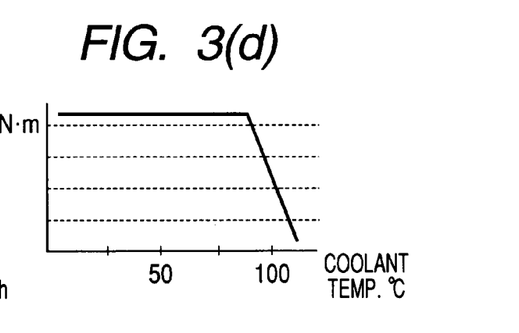

FIG. 3(d) demonstrates a torque control curve used to limit the output torque of the power train as a function of the temperature of coolant of the engine 80. Specifically, when the coolant temperature exceeds a preselected one, the torque to be outputted by the power train is decreased to avoid overheating of the engine 80.

Figure 3E:
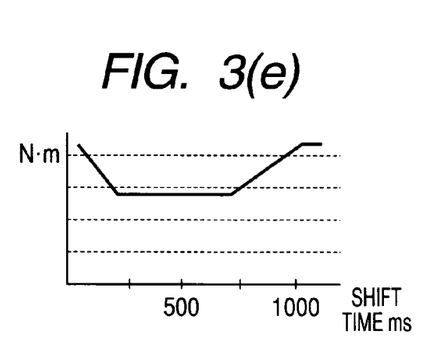

FIG. 3(e) demonstrates a torque control curve used to limit the output torque of the power train as a function of a shift timing of the transmission 90. Specifically, the torque to be outputted by the power train is decreased during a period of time between the start and completion of gear shifting of the transmission 90 to minimize the shift shock.

Figure 3F:
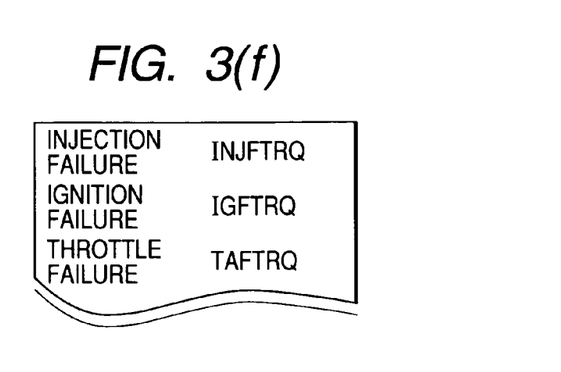

FIG. 3(f) demonstrates a table which lists upper torque limits as selected according to the types or degrees of seriousness of failures in operation of the power train. When the degrees of seriousness of the failures are greater, a lower one of the upper torque limits is selected.

Referring back to step 110 in FIG. 2, the power train control unit 20 finds upper torque limits by look-up using the torque curve, the torque control curves, and the table, as illustrated in FIGS. 3(a) to 3(f), based on the parameters, as derived in step 100, and selects the lowest one of them as the upper limit TRQMX of the allowable torque range of the power train.

The routine proceeds to step 120 wherein a lower limit TRQMN of the allowable torque range is determined using the parameters indicating the operating conditions of the power train, as derived in step 100. An example of this determination will be described below using FIGS. 4(a) to 4(d).

Figure 4A:
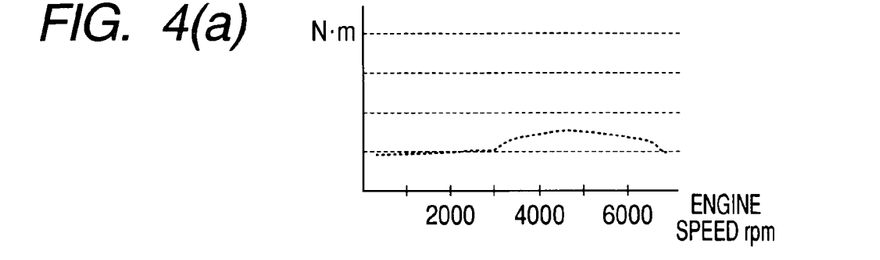
FIGS. 4(a), 4(b), 4(c), and 4(d) are maps used to delimit an allowable torque range of a power train.

FIG. 4(a) demonstrates a torque curve which depends upon the type of the power train and represents a minimum torque the power train is permitted to output as a function of speed of the engine 80.

Figure 4B:
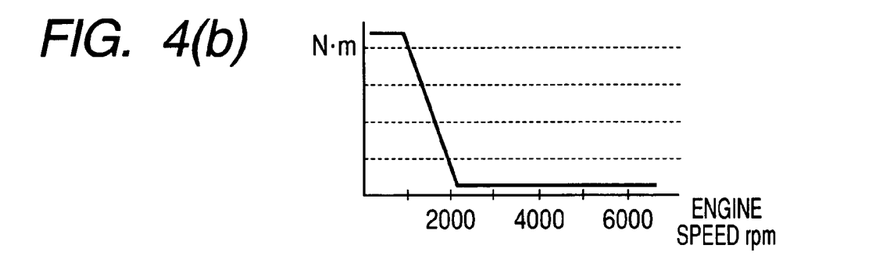

FIG. 4(b) illustrates a lower torque limit curve indicating a lower torque limit as determined as a function of the speed of the engine 80. Specifically, the lower torque limit is increased within a lower speed range of the engine 80 for avoiding engine stall.

Figure 4C:
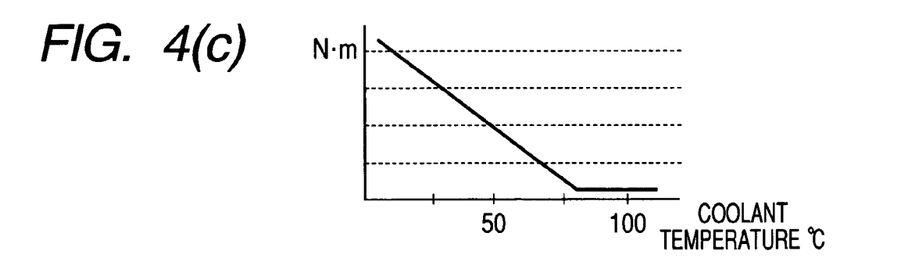

FIG. 4(c) demonstrates a lower torque limit curve indicating a lower torque limit as determined as a function of the temperature of coolant of the engine 80. When the coolant temperature is low, the torque to be outputted by the power train is increased to warm up the engine 80.

Figure 4D:
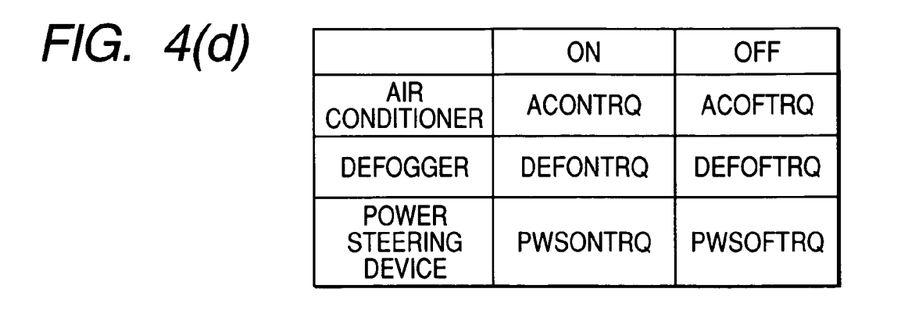

FIG. 4(d) demonstrates a table which lists lower torque limits as selected depending upon whether the engine-driven accessories, e.g., the air conditioner, the defogger, and the power steering device are turned on or off. When each of the accessories is turned on, a higher one of the lower torque limits is selected. The higher ones are predetermined independently in terms of the degrees of engine power consumed by the accessories. When two or more of the accessories are in the on-state simultaneously, a total of selected ones of the lower torque limits is used.

Referring back to step 120 in FIG. 2, the power train control unit 20 finds lower torque limits by look-up using the lower torque limit curves and the table, as illustrated in FIGS. 4(a) to 4(d), based on the parameters, as derived in step 100, and selects the highest one of them as the lower limit TRQMN of the allowable torque range of the power train.

The torque which is allowed to be outputted by the power train, but may result in some problem to be experienced by the system vehicle as a whole should not be outputted. The power train control unit 20 determines, as apparent from the above discussion, determines the allowable torque range of the power train depending upon the performance of the power train and alters or corrects it so that the power train does not output unwanted torque.

After step 120, the routine proceeds to step 130 wherein data on the upper limit TRQMX and the lower limit TRQMN of the allowable torque range of the power train, as determined in steps 110 and 120, is outputted to the manager control unit 10 through the LAN 70. The routine then terminates.

Figure 5:
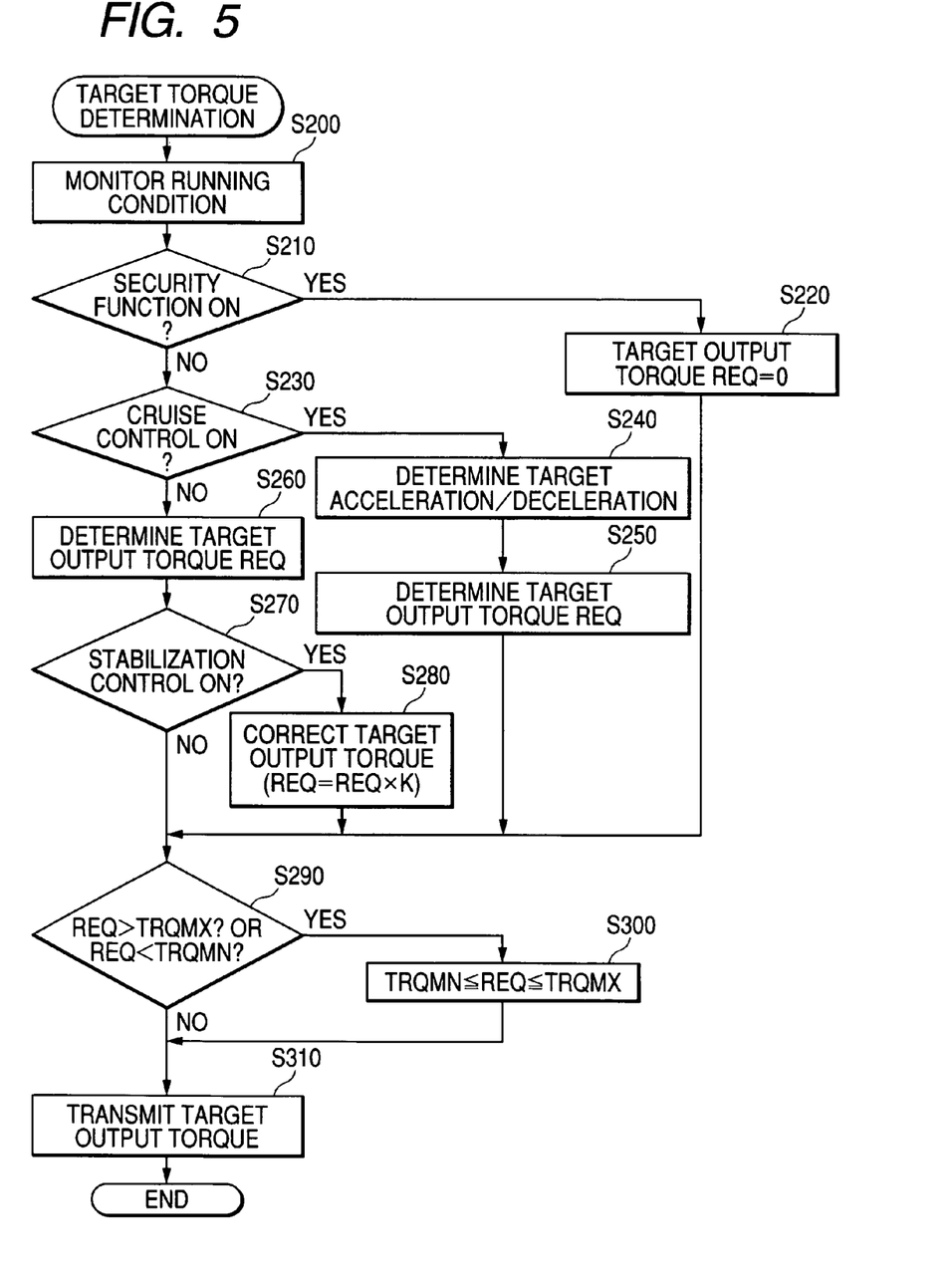
FIG. 5 is a flowchart of a program to be executed by a manager control unit of the vehicle control system of FIG. 1 to determine a target output torque of a power train within an allowable torque range.

FIG. 5 is a flowchart of a program to be executed by the manager control unit 10 to determine the target output torque of the power train within the allowable torque range, as determined by the power train control unit 20.

First, in step 200, operating conditions of the system vehicle are sampled. Specifically, the manager control unit 10 monitors preselected parameters indicating maneuvers of the driver such as efforts on the accelerator pedal and the brake pedal and the degree of turning of the steering wheel (i.e., a steered angle of the steering wheel), vehicle running conditions such as the speed of the system vehicle, the rotational speed of each wheel, the distance to a preceding vehicle, and the yaw rate and acceleration acting on the body of the system vehicle, requests from the various vehicle controllers affecting on the target output torque of the power train, and the torque actually outputted by the power train under control of the power train control unit 20.

The actual torque outputted by the power train is used as a basis for determining a target output torque REQ of the power train. When it is required to increase the torque to be outputted by the power train, a required amount is added to the actual torque to determine the target output torque REQ. Alternatively, when it is required to decrease the torque to be outputted by the power train, a required amount is subtracted from the actual torque to determine the target output torque REQ.

The routine proceeds to step 210 wherein the security control unit 40 monitors the on/off state of the security function, as described above, to determine whether the security system is being activated or not. Specifically, it is determined whether an identification code transmitted from a portable key does not match an authorized one, so that the security control unit 40 has to lock the steering wheel and/or disenable the engine 80 or not. If a YES answer is obtained, then the routine proceeds to step 220 wherein the target output torque REQ is set to zero (0). Alternatively, if a NO answer is obtained, then the routine proceeds to step 230 wherein it is determined whether the vehicle control system is performing the adaptive cruise control, as described above, or not. If a YES answer is obtained, then the routine proceeds to step 240 wherein a target acceleration/deceleration required, as described above, to keep the distance to a preceding vehicle at a set one is calculated. The routine proceeds to step 250 wherein the target output torque REQ is determined based on the target acceleration/deceleration, as derived in step 240. When the adaptive cruise control is being entered, the vehicle driver usually does not operate the acceleration pedal and the brake pedal. The target output torque REQ is, therefore, determined according to a request from the adaptive cruise control.

The routine proceeds to step 270 wherein it is determined whether it is required to perform the vehicle stabilization control, as described above, such as the traction control or the attitude control or whether the vehicle stabilization control is now being performed or not. Specifically, the manager control unit 10 monitors a difference between the speed of the system vehicle (i.e., the speed of compliance ones of the wheels) and the speed of driven ones of the wheels during acceleration of the system vehicle to detect an acceleration slippage of the driven wheels. If such a slippage is detected, the manager control unit 10 decides that the traction control is required to be initiated. Once initiated, the traction control continues until the acceleration slippage is determined to have been eliminated. Additionally, the manager control unit 10 also monitors a difference between a yaw rate, as calculated using a steered angle of the steering wheel and the speed of the system vehicle, and a yaw rate actually acting on the body of the vehicle, as measured by using, for example, a yaw rate sensor, to determine whether the system vehicle is now placed in an understeered or an oversteered state or not. If such an unstable condition is detected, the manager control unit 10 determines that the attitude control is required to be initiated. Once initiated, the attitude control continues until the attitude of the system vehicle is determined to have been stabilized.

If a YES answer is obtained in step 270, then the routine proceeds to step 280 wherein the target output torque REQ, as derived in step 260, is decreased to minimize the acceleration slippage or the degree of understeering or oversteering of the system vehicle upon a request from the vehicle stabilization controls.

Alternatively, if a NO answer is obtained in step 270, then the routine proceeds to step 290 wherein it is determined whether the target output torque REQ, as derived in step 220, 250, or 260, or 280, is greater than the upper torque limit TRQMX or smaller than the lower torque limit TRQMN, as derived in the flowchart of FIG. 2.

If a YES answer is obtained in step 290 meaning that the target output torque REQ is out of the allowable torque range, then the routine proceeds to step 300 wherein the target output torque REQ is so corrected as to fall within the allowable torque range. Specifically, when the target output torque REQ is greater than the upper torque limit TRQMX, the upper torque limit TRQMX is determined as the target output torque REQ. Alternatively, when the target output torque REQ is smaller than the lower torque limit TRQMN, the lower torque limit TRQMN is determined as the target output torque REQ. This corrects the target output torque REQ to be a value nearest to the initial one within the allowable torque range.

Finally, the routine proceeds to step 310 wherein a signal indicative of the target output torque REQ is outputted to the power train control unit 20.

Figure 6:
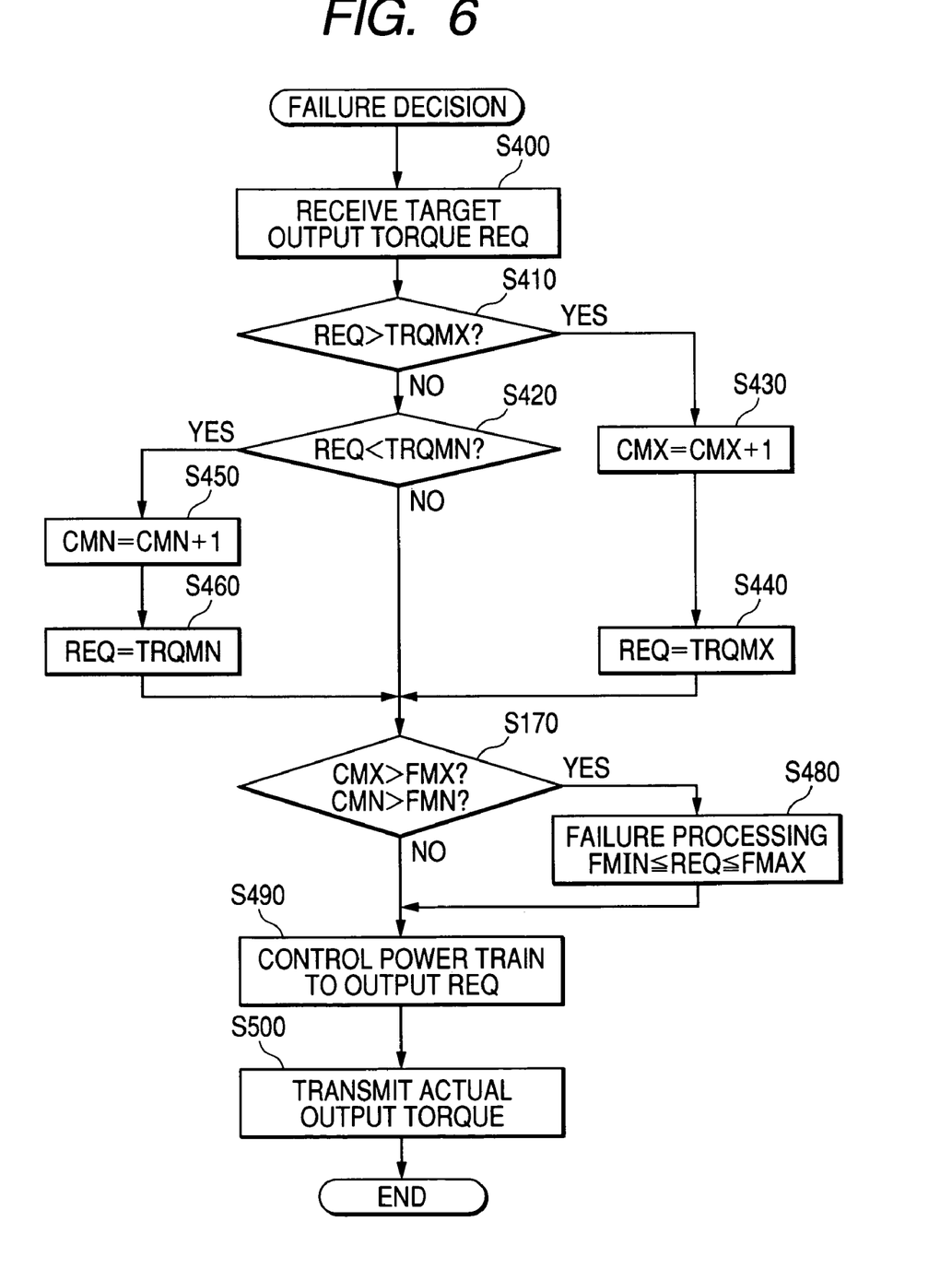
FIG. 6 is a flowchart of a program to be executed by a power train control unit of the vehicle control system of FIG. 1 to determine whether a target output torque is in error not and to correct the target output torque in the event of such an error.

FIG. 6 is a flowchart of a program to be executed by the power train control unit 20 to determine whether the target output torque REQ, as determined in the manager control unit 10, is in error not and to correct the target output torque in the event of such an error.

First, in step 400, the power train control unit 20 samples the signal indicative of the target output torque REQ outputted from the manager control unit 10. The routine proceeds to step 410 wherein it is determined whether the target output torque REQ, as sampled in step 400, is greater than the upper torque limit TRQMX or not. If a YES answer is obtained, then the routine proceeds to step 430 wherein an upper limit error counter value CMX is incremented by one (1). The routine proceeds to step 440 wherein the target output torque REQ is corrected to be the upper torque limit TRQMX.

Alternatively, if a NO answer is obtained in step 410, then the routine proceeds to step 420 wherein it is determined whether the target output torque REQ is smaller than the lower torque limit TRQMN or not. If a YES answer is obtained, then the routine proceeds to step 450 wherein a lower limit error counter value CMN is incremented by one (1). The routine proceeds to step 460 wherein the target output torque REQ is corrected to be the lower torque limit TRQMN.

The manager control unit 10, as described above, determines the target output torque REQ within the allowable torque range, as set by the power train control unit 20. Therefore, when it is determined in the power train control unit 20 that the target output torque REQ is out of the allowable torque range, an error may be considered to have arisen in the target output torque REQ due to some failure in operation of the manager control unit 10 or in signal transmission through the LAN 70. Such a failure is detected by steps 410 and 420.

After step 420, 440, or 460, the routine proceeds to step 470 wherein the upper limit error counter value CMX is greater than a given value FMX or not or whether the lower limit counter value CMN is greater than a given value FMN or not. It is advisable that the values FMX and FMN be selected so that a YES answer is obtained in step 470 after the upper and lower limit error counter values CMX and CMN are counted up a sequence of times in order to eliminate undesirable effects of noises on the stability in detecting the error of the target output torque REQ.

If a YES answer is obtained in step 470 meaning that the error has arisen in the target output torque REQ, then the routine proceeds to step 480 wherein a failure processing is performed to limit the target output torque REQ to within a safe torque range at least required to permit the system vehicle to travel to an automotive workshop, for example, a failure code is stored, and the driver is warned of the occurrence of the failure.

After step 470 or 480, the routine proceeds to step 490 wherein the power train control unit 20 controls the operating condition of the power rain to bring an output of the power train into agreement with the target output torque REQ. Specifically, the power train control unit 20 selects a combination of an output of the engine 80 and a gear ratio of the transmission 90 required to have the power train produce the target output torque REQ and controls the engine 80 and the transmission 90 so as to establish such a selected combination. The routine proceeds to step 500 wherein data on the output of the power train achieved under the control of the power rain control unit 20 is transmitted to the manager control unit 10 to complete the failure processing.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A vehicle control system comprising:
   a target output torque determining block which determines a target output torque of a power train of a vehicle at least based on a preselected operating maneuver by an operator of a vehicle;
   an allowable torque range determining block which determines an allowable torque range, within which the power train is allowed to output torque, based on an operating condition of the power train;

a target output torque correction block which keeps the target output torque, as determined by said target output torque determining block, as it is when the target output torque lies within the allowable torque range and also corrects the target output torque to be within the allowable torque range when the target output torque lies out of the allowable torque range; and a power train control block which controls an operating of the power train to bring an output of the power train into agreement with the target output torque, as provided by said target output torque correction block, wherein said target output torque determining block and said target output torque correction block are constructed in a first electronic control unit, and said allowable torque range determining block and said power train control block are constructed in a second electronic control unit, wherein said second electronic control unit determines the allowable torque range of the power train through said allowable torque range determining block and transmits a signal indicative thereof to said first electronic control unit, wherein said first electronic control unit receives the signal from said second electronic control unit to sample the allowable torque range and determines the target output torque within the allowable torque range through said target output torque determining block and said target output torque correction block to output a signal indicative thereof to said second electronic control unit, and wherein said second electronic control unit includes a failure determination block which compares the target output torque, as carried by the signal from said first electronic control unit, with the allowable torque range, when the target output torque lies out of the allowable torque range, said failure determination block determining that an error has arisen in the target output torque.

2. A vehicle control system as set forth in claim 1, wherein said allowable torque determining block uses a specific torque output characteristic of the power train as a basis and considers an actual operating condition of the power train into account for determining the allowable torque range.

3. A vehicle control system as set forth in claim 1, wherein the power train includes an engine and a transmission, and wherein said allowable torque determining block uses as the operating condition of the power train at least one of a speed of the engine, a temperature of coolant of the engine, a shift timing of the transmission, a load on the engine resulting from an operation of an engine-driven accessory, and a running speed of the vehicle.

4. A vehicle control system as set forth in claim 1, wherein said allowable torque determining block uses information on a failure in controlling the power train as the operating condition of the power train and decreases an upper limit of the allowable torque range.

5. A vehicle control system as set forth in claim 1, wherein said target output torque determining block also uses an operating condition of the vehicle to determine the target output torque of the power train.

6. A vehicle control system as set forth in claim 5, wherein said target output torque determining block also uses as the operating condition of the vehicle at least one of requests from an adaptive cruise control to bring a distance between the vehicle and a preceding vehicle to agreement with a set one, a vehicle stabilization control to stabilize running of the vehicle, and a vehicle security control.

7. A vehicle control unit as set forth in claim 1, wherein said failure determining block makes a determination of whether the target output torque lies out of the allowable torque range or not in a cycle, when a consecutive number of determinations that the target output torque lies out of the allowable torque range are made, said failure determining block determining that the error has arisen.

8. A vehicle control system as set forth in claim 1, wherein when said failure determining block determines that the error has arisen, said second electronic control unit sets a value of the target output torque to within a given safe torque range and controls the power train to bring an output of the power train into agreement with the set value of the target output torque.

9. A vehicle control system as set forth in claim 1, further comprising a brake control block which controls a brake torque to be applied to a wheel of the vehicle, wherein said target output torque determining block and said target output torque correction block are constructed in a manager control unit, and wherein at least one of said power train control block and said brake control block transmits a signal indicative of an operating condition of the vehicle to said manager control unit, said manager control unit also uses the operating condition of the vehicle to determine the target output torque of the power train.

\* \* \* \* \*